(12) United States Patent
Culler et al.

(10) Patent No.: US 11,599,102 B2
(45) Date of Patent: Mar. 7, 2023

(54) BURNER HEALTH MONITORING USING VIBRATION SENSING

(71) Applicant: Honeywell International Inc., Charlotte, NC (US)

(72) Inventors: Wyatt Culler, Berne, IN (US); David Kucera, Bilovice nad Svitavou (CZ); Martin Bragg, Carlisle (GB)

(73) Assignee: Honeywell International Inc., Charlotte, NC (US)

( * ) Notice: Subject to any disclaimer, the term of this patent is extended or adjusted under 35 U.S.C. 154(b) by 65 days.

(21) Appl. No.: 17/144,313

(22) Filed: Jan. 8, 2021

(65) Prior Publication Data

US 2022/0221846 A1 Jul. 14, 2022

(51) Int. Cl.
 *G05B 23/02* (2006.01)
 *F23N 5/24* (2006.01)
 *G01H 11/06* (2006.01)
(52) U.S. Cl.
 CPC ......... *G05B 23/0227* (2013.01); *F23N 5/242* (2013.01); *G01H 11/06* (2013.01); *G05B 23/0283* (2013.01); *F23N 2229/14* (2020.01)
(58) Field of Classification Search
 CPC . G05B 23/0227; G05B 23/0283; F23N 5/242; F23N 2229/14; G01H 11/06
 See application file for complete search history.

(56) References Cited

U.S. PATENT DOCUMENTS

| | | | |
|---|---|---|---|
| 10,072,843 B2 | 9/2018 | Baramov et al. | |
| 2014/0069195 A1 | 3/2014 | Ledbetter et al. | |
| 2015/0316262 A1* | 11/2015 | Immer | F23N 5/242 431/2 |
| 2017/0219208 A1* | 8/2017 | Song | F23N 5/16 |
| 2019/0302811 A1 | 10/2019 | Bragg | |
| 2020/0141653 A1 | 5/2020 | Kucera et al. | |
| 2020/0220491 A1* | 7/2020 | Yoshida | H01L 41/113 |

FOREIGN PATENT DOCUMENTS

| | | |
|---|---|---|
| EP | 3547067 A1 | 10/2019 |
| WO | 2020023020 A1 | 1/2020 |

OTHER PUBLICATIONS

European Search Report for corresponding EP Application No. 21217651.5 dated Jul. 4, 2022.

* cited by examiner

*Primary Examiner* — Manuel L Barbee
(74) *Attorney, Agent, or Firm* — Paschall & Associates, LLC; Mark Goldberg

(57) ABSTRACT

An electronic device and a method are disclosed. The electronic device includes a sensor, a memory, a processor, and a communication interface. The sensor is configured to detected vibrations of a burner system including any component of a burner system. The memory is configured to store the detected vibrations. The processor is configured to record the detected vibrations caused by the burner system at a predetermined time interval. The processor is also configured to generate a report of the recorded vibrations caused by a burner component to indicate the operational status of the burner, wherein the generated report includes at least two recorded vibrations. The communication interface configured to transmit the generated report.

18 Claims, 5 Drawing Sheets

BURNER HEALTH MONITORING USING VIBRATION SENSING

TECHNICAL FIELD

This disclosure relates generally to industrial process control and automation systems. More specifically, this disclosure relates to an apparatus and method to monitor burner health from data received from vibration sensors on a burner system and analyzing various parameters that indicate the operational status of the components of the burner system.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations. Various sensors and valves provide control to the automation system, and when a valve or sensor fails various issues can occur to the automation system.

A gas burner is a device that produces a controlled flame by mixing a fuel gas such as acetylene, natural gas or propane with an oxidizer such as the ambient air or supplied oxygen and allowing for ignition and combustion. The flame is generally used for the heat it produces. A gas burner consists of a combination of parts that may include a combustion air blower, burner body, air and fuel intakes, control valves exhaust stack or outlet and safety shut off valves. Other components may be present in gas burners used for different purposes. Faulty operating conditions in any of these parts may cause the burner to malfunction.

A vibration sensor can provide the first clue that there is an issue with operation of a piece of equipment. There are at least two important aspects of vibration that are to be considered. The monitoring of vibrations and the performance of maintenance based on sensor data to avoid future issues. Excessive vibrations often indicate present or imminent hardware failure in moving parts such as pressure regulator diaphragms, motors, control valves, and the like. In non-moving parts, changes in the frequency of vibrations often indicate current or imminent hardware failure, as hardware failure causes changes in part geometry which in turn causes the fluid moving though the part to generate different vibration frequencies.

SUMMARY

This disclosure provides an apparatus and method for automatic contextualization and issue resolution related to an industrial process control and automation system.

In a first embodiment, an electronic device includes a vibration sensor, an information repository a processor and a communication interface. The vibration sensor configured to detected vibrations of any aspect of a burner system. The information repository configured to store the detected vibrations. The processor is configured to record the detected vibrations caused by any components of the burner system at a predetermined time interval. The processor is also configured to generate a report of the recorded vibrations to indicate the operational status of the burner system, wherein the generated report includes at least two recorded vibrations and usually more. The communication interface is configured to transmit the generated report.

In a second embodiment, an electronic device includes a communication interface and a processor. The communication interface is configured to receive a report and transmit a notification message, wherein the received report includes recorded vibrations of a burner system. The processor is configured to identify a pattern in the vibrations within the received report based on at least one of frequency or magnitude of the vibrations. The processor is also configured to analyze the recorded vibrations to detect a change in the identified pattern. The processor is further configured to generate a notification message indicating an operational status of the burner system based on whether a change in the vibration pattern is identified.

In a third embodiment, a method detecting vibrations of a burner system. The method also includes recording the detected vibrations caused by any components of the burner system at a predetermined time interval. The method further includes generating a report of the recorded vibrations caused any components of the burner system to indicate the operational status of the burner system, wherein the generated report includes at least two recorded vibrations. The method also includes transmitting the generated report Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
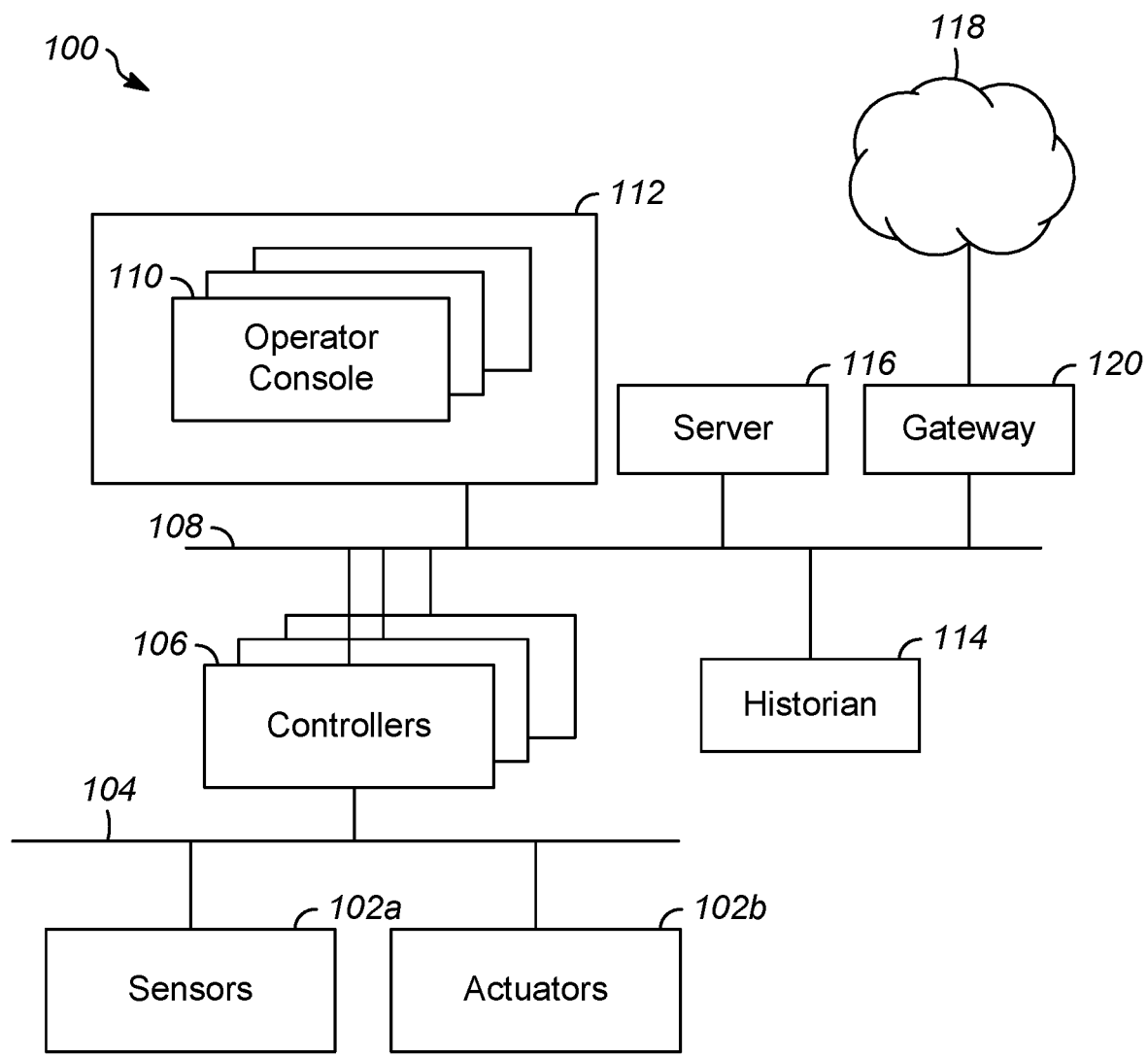
FIG. 1 illustrates an example industrial process control and automation system according to this disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

The typical approach to maintenance for industrial combustion systems is to fix things as they break. This approach can cause costly unplanned downtime and losses in efficiency. The solution to this problem is active health monitoring and predictive maintenance using various vibration sensors and conventional sensors mounted in different locations on the burner system. This invention is unique as compared to prior art because it describes a system and a method of applying vibration sensors to burner components to monitor burner health. When compared to other sensing technologies, vibration sensors are relatively inexpensive and robust. They can also be mounted to systems with minimal hardware modifications, meaning they are also suitable for retrofit applications. Vibration sensors can be mounted on various surfaces of existing gas-carrying components non-intrusively, keeping the gas to air sealed barrier intact, thus avoiding costly safety re-approvals and safety concerns. Vibration sensors consume relatively little power which opens the possibility to power them locally by energy harvesting, power over communication bus, battery, or other energy sources with limited power output. The exact location of vibration sensors will depend on the burner type and setup. The following locations may be used, and some of the following likely fault conditions that be detected are listed, an ignition transformer or other ignition device, a burner motor and blower, intakes for oxygen to enter and be combined with fuel, fuel lines for gas or liquid fuel, etc.

Generally, components in burner systems vibrate as the devices exhibit unstable tendencies. For example, fuel lines often vibrate, or hum while in use. There are vibrations during operation of burner motors and other vibrations that are present during ignition. In certain embodiments, the vibrations increase based on the flow rate, pressure, temperature as well as the physical parameters of the burner system. Physical parameters can include the volume of the various compartments as well as the size of the inlet and outlet piping. The frequency of the vibrations or humming can provide an indication as to the longevity of the burner component. For example, if the frequency of the vibrations remains steady then the burner component is not in risk of failing. In contrast, if the frequencies of the vibrations are not steady or the magnitude of the frequency changes then the burner component could be in risk of failing. Many factors affect the frequency of vibrations such as the flow rate of the gas, the pressure and temperature of the gas as it flows.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102 *a* and one or more actuators 102*b*. The sensors 102*a* and actuators 102*b* represent components in a process system that may perform any of a wide variety of functions. For example, the sensors 102*a* could measure a wide variety of characteristics in the process system, such as temperature, pressure, flow rate, or a voltage transmitted through a cable. Also, the actuators 102*b* could alter a wide variety of characteristics in the process system, such as valve openings. The sensors 102*a* and actuators 102*b* could represent any other or additional components in any suitable process system. Each of the sensors 102*a* includes any suitable structure for measuring one or more characteristics in a process system. Each of the actuators 102*b* includes any suitable structure for operating on or affecting one or more conditions in a process system. In certain embodiments, sensors 102*a* and actuator 102*b* are connected to network 104. Network 104 generally represents any suitable communication network(s). In certain embodiments, network 104 is an internal network that provides feedback of the sensor 102 *a* and actuator 102 *b* to owners/operators of the system 100. For example, sensor 102 *a* can include an indicator that indicates the performance of the specific sensor or reports the measured parameters to the owners/operators of the system 100. In certain embodiments, network 104 is an external network, outside the control of owners/operators of the system 100 but provides feedback of the sensor 102*a* and actuator 102*b* to a third-party network. For example, sensor 102*a* can include an indicator that indicates the performance of the specific sensor or reports the measured parameters to a third-party system.

At least one network 104 is coupled to the sensors 102*a* and actuators 102*b*. The network 104 facilitates interaction with the sensors 102*a* and actuators 102*b*. For example, the network 104 could transport measurement data from the sensors 102*a* and provide control signals to the actuators 102*b*. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102 *a* to control the operation of one or more actuators 102*b*. For example, a controller 106 could receive measurement data from one or more sensors 102*a* and use the measurement data to generate control signals for one or more actuators 102*b*. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one networks 108 couples to the controllers 106 and other devices in the system 100. The network 108 facilitates the transport of information between components. The networks 108 could represent any suitable networks or combination of networks. As particular examples, the networks 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. The servers can be locally or located remotely from the control and automation system 100. For instance, the functionality of a server could be implemented in a computing cloud or a remote server communicatively coupled to the control and automation system 100 via a gateway such as gateway 120. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In accordance with this disclosure, one or more other process variable measurements can be correlated with the pressure of material through the structure, and the other process variable measurements can be used to verify whether the components are operating correctly. For example, a controller 106, operator console 110, server 116, or computing cloud 118 could use one or more models associating the pressure, temperature of flow of the material through the structure with one or more other process variables. Measurements associated with the one or more other process variables can be obtained and used to verify the operational status of the burner component.

The sensors 102a in FIG. 1 include at least one burner component for the industrial process. As noted above, the failure of a burner component can cause various problems, such as disruptions in an industrial process, safety issues, or environmental damage.

Generally, various sensors 102a and actuators 102b, are traditionally not connected to network 104 due to their remote location within the system 100. As a result, signs that can indicate an operational decline of a component of a burner system can go undetected when the device is not connected to network 104. Embodiments of the present disclosure provide network access to remote sensors 102a and actuators 102b that are traditionally not connected to network 104 by generating electrical energy to power sensors, actuators and a communication interface. Additionally, embodiments of the present disclosure provide methods to derive the operational status of a burner component based on variations of the innate vibrations associated with the valve as well as changes in the pressure, temperature, or flow upstream and downstream of the burner component.

In certain embodiments, the vibrations associated with the burner system provide an indication as to the functioning of the burner system. In certain embodiments, temperature, pressure, flow rate, or a combination thereof, of the gas or liquid stream immediately upstream and downstream of the burner system can also provide an indication as to the functioning of the burner system.

In certain embodiments, the components of the burner system are similar to the actuator 102b and affixed to an energy generator. The energy generator converts mechanical vibrations of the burner components to electrical energy to power one or more sensors and a communication interface. The communication interface transmits readings from the one or more sensors via network 108 to a controller 106 or an end user device. The transmitted readings provide an indication as to operational status of any components of the burner system or other sensors.

In certain embodiments, network 108 is a wireless network that connects the burner component to one or more controllers 106, or a user device. For example, the communication interface associated with the burner component is connected to a third-party network outside the control of owners/operators of the system 100. That is, the third-party network provides feedback of the sensor 102a and actuator 102b to a third party server that can provide an indication of the performance of the specific sensor or actuators (such as sensors 102a and actuators 102b) as well as generate reports as to the functioning of the sensor or actuators of system 100.

In certain embodiments, server 116 can correlate changes in the vibrations to additional data such as temperature, pressure, flow rate, or a combination thereof, of the gas or liquid entering and exiting the burner system. Server 116 can identify whether the change in vibrations of the burner component is due to a change in one or more temperature, pressure, or flow rate of the gas or liquid or whether any component of the burner system is failing. Thereafter, the server 116 can transmit a message to the proper operation station, user device or the like to notify that a component of the burner system is failing.

The widespread use of mobile "smart" devices (such as APPLE IPHONEs and IPADs and ANDROID devices) allows users to remain connected to and to interact with remote computing devices from virtually anywhere each user travels. Among other things, this could allow personnel associated with an industrial process control and automation system, such as system 100, to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time. For example, users can receive notifications as to the operational status of sensor 102a or actuator 102b in the event that sensor 102a or actuator 102b fails or starts to exhibit an indication of failing. This allows personnel to maintain situational awareness with respect to the control and automation system even when the personnel are outside of a control room or other typical work location.

In certain embodiments, the system 100 may optionally include one or more mobile devices (not shown), such as a mobile "smart" device. Each mobile device could be used to obtain information about one or more industrial processes or the system 100 and display the information to users. Each mobile device could also be used to obtain input from the users altering how the industrial processes are controlled by the system 100. A mobile device could be used in any other suitable manner in or with the system 100. Any suitable type(s) of mobile devices could be used in or with the system 100, such as smartphones, tablet computers, or laptop computers.

Although FIG. 1 illustrates one example of an industrial process control and automation system 100, various changes may be made to FIG. 1. For example, a control and automation system 100 could include any number of sensors, actuators, controllers, servers, operator stations, operator consoles, control rooms, historians, networks, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where at least one burner component can be monitored. This functionality can be used in any other suitable system, and that system need not be used for industrial process control and automation.

Industrial processes are typically implemented using large numbers of devices, such as pumps, valves, compressors, or other industrial equipment. Similarly, industrial process control and automation systems are typically implemented using large numbers of devices, such as the sensors 102a, actuators 102b, controllers 106, and other components in FIG. 1. Various networks can be used to couple these devices together and transport information.

Figure 2:
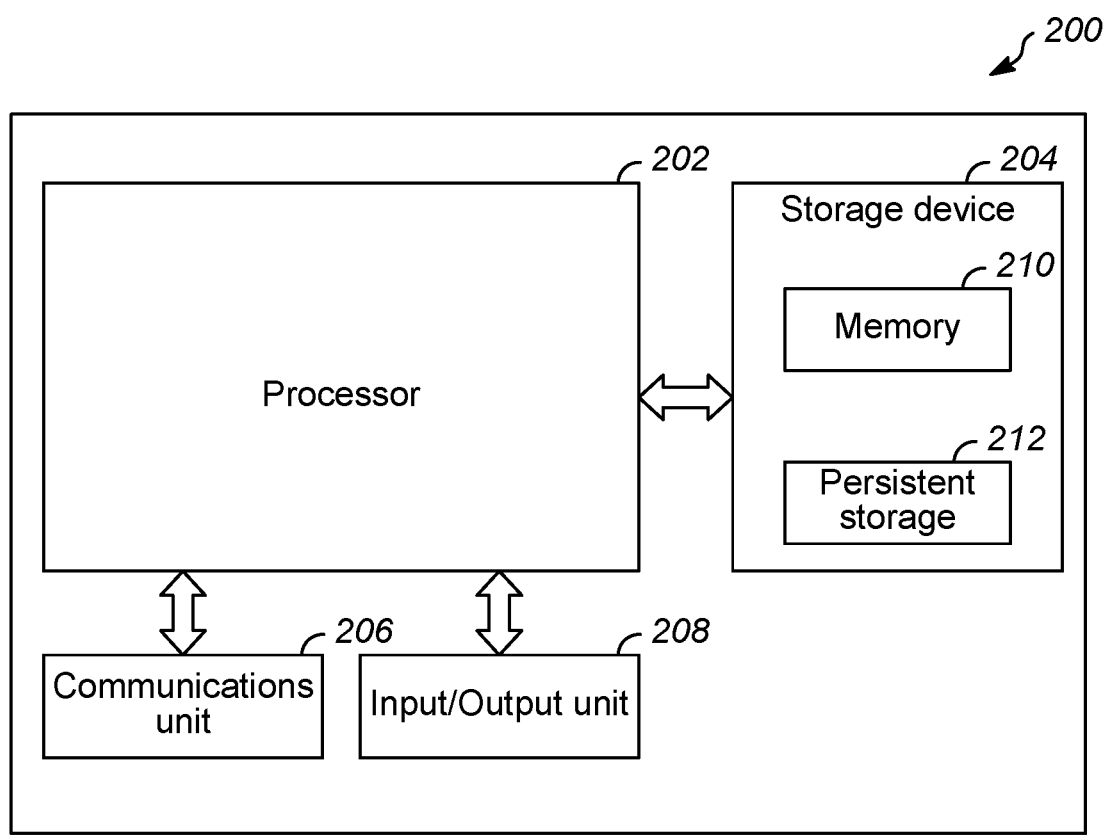
FIG. 2 illustrates an example of devices for user processing the operational status of devices according to this disclosure.

FIG. 2 illustrates example devices for user processing the operational status of devices according to this disclosure. In particular, FIG. 2 illustrates an example computing device 200. In some embodiments, the computing device 200 could denote an operator console, server, a remote server or device, or a mobile device. The computing device 200 could be used to run applications. The computing device 200 could be used to perform one or more functions, such as monitoring vibrations of a burner component, generating and transmitting a notification based on the operational status of a burner component, or recording and transmitting the vibrations associated with a burner component. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random-access memory or any other suitable volatile or non-volatile storage device(s). The persistent storage 212 may contain one or more components or devices supporting longer-term storage of data, such as a read-only memory, hard drive. Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touch screen, or other suitable input device. The L/O unit 208 may also send output to a display, printer, or other suitable output device.

Figure 3:
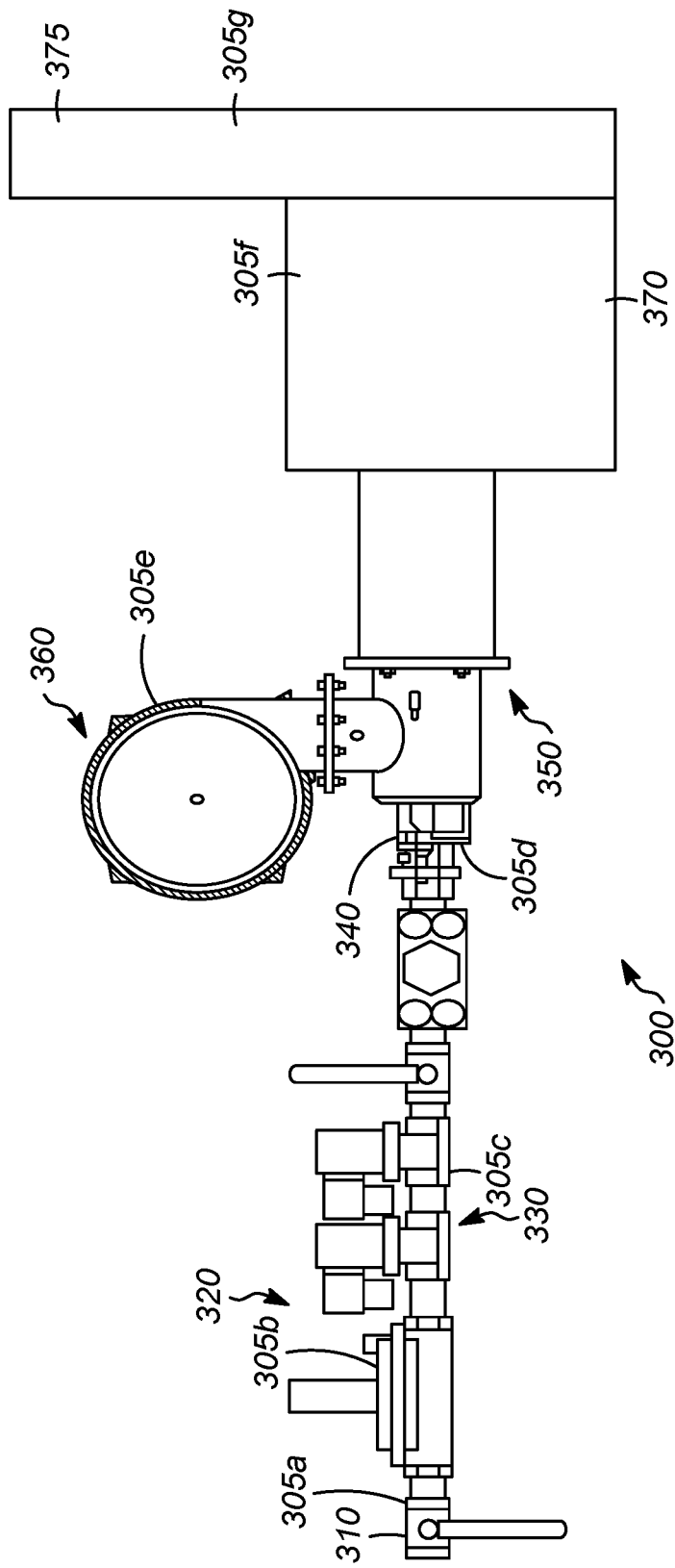
FIG. 3 illustrates an example of a burner system according to this disclosure.

FIG. 3 illustrates an example of a gas burner system 300 with typical burner components each of which is shown with vibration sensors 305a-g in positions to detect vibrations occurring and to communicate them as explained herein. A fuel flow enters through fuel inlet 310. A fuel pressure regulator 320 is shown as are safety shutoff valves 330 and control valves 340. Further illustrated are burner body 350, blower 360, combustion chamber 370 and exhaust stack 375. Excessive or unusual vibrations are detected by the strain or piezo type vibration sensors mounted on areas such as the burner body, the pressure regulator, the blower, the control valves, etc. These sensors detect both the amplitude and frequencies of the vibrations and monitor them for changes. As discussed above, embodiments of the present disclosure provide for a burner system that is capable of harvesting energy absent an electrical grid and able to record as well as transmit reports at predetermined time intervals to indicate the status of various components, sensors and actuators of the burner system 300.

Figure 4:
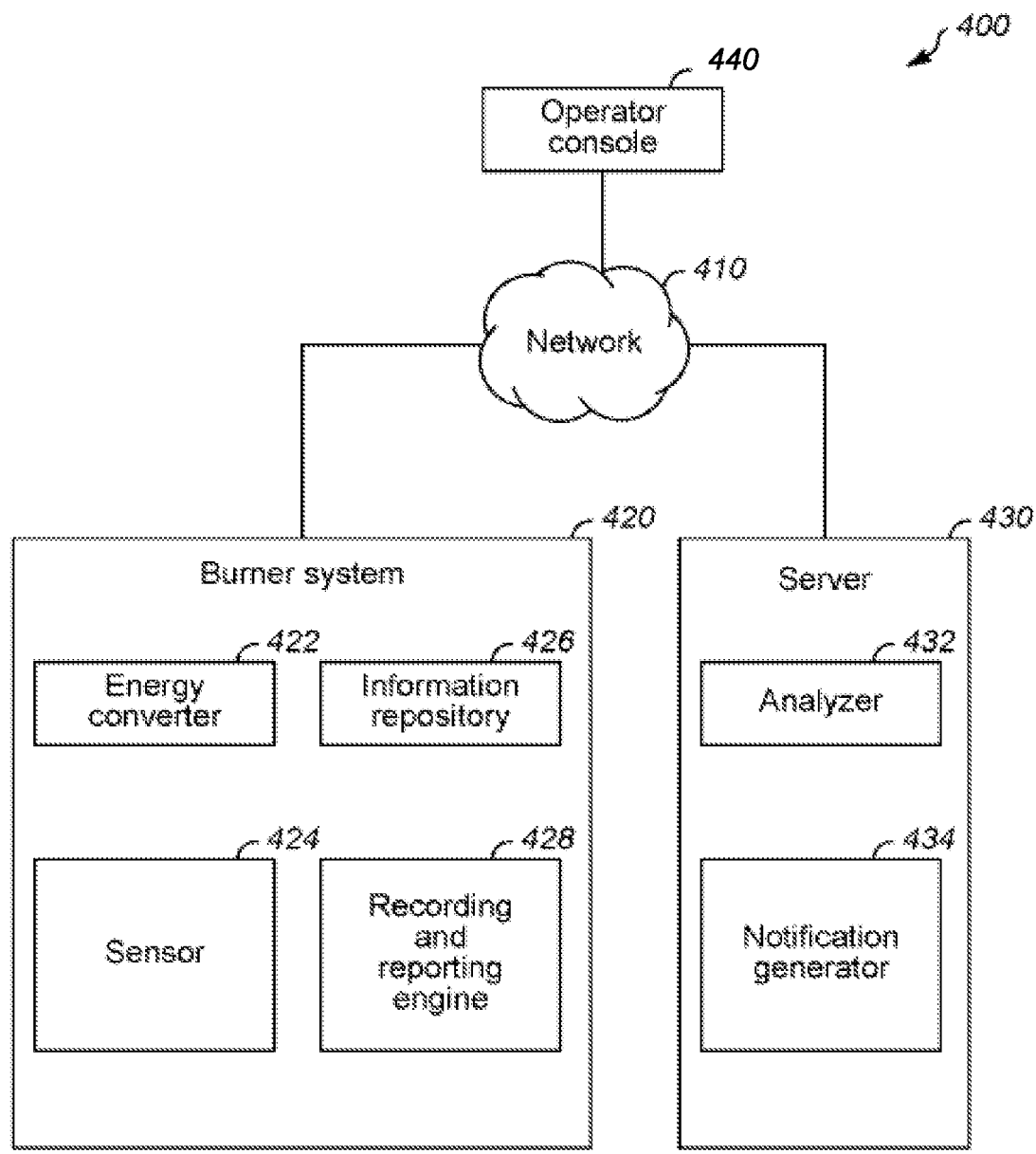
FIG. 4 illustrates an example block diagram according to this disclosure.

FIG. 4 illustrates an example block diagram 400 according to this disclosure. FIG. 4 illustrates a high-level architecture, in accordance with an embodiment of this disclosure. The embodiment of the block diagram 400 shown in FIG. 4 is for illustration only. Other embodiments can be used without departing from the scope of the present disclosure. Block diagram 400 includes a burner system 420, a server 430, and an operator console 440 are interconnected and capable of communicating via network 410.

In certain embodiments, network 410 includes a larger networking environment. For example, network 410 can be used for communication between the burner system 420 and the server 430 as well as communication between the server 430 and the operator console 440. In another example, network 410 can be used for communication between the burner system 420 and the operator console 440. Network 410 also is able to provide communication medium between the pressure regulating valve and additional servers and equipment (not shown). For example, network 410 can be connected to an information repository (i.e., a database) that contains historical data pertaining to the burner system 420 or additional sensors associated with the burner system 420.

In certain embodiments, network 410 represents a "cloud" of computers interconnected by one or more networks, where network 410 is a computing system utilizing clustered computers and components to act as a single pool of seamless resources when accessed. In certain embodiments, network 410 represents a wireless network that can range is sized from Near Field Communication (NFC) to Local Area Networks (LANs) to wide area networks (WAN). In certain embodiments, network 410 provides access to the internet or other remote networks.

As discussed above, the burner system 420 regulates the pressure in a high-pressure gas system. The valve allows high pressure gas to flow into an orifice, and when the gas exits the valve, the gas pressure is reduced or stabilized or both. The burner system 420 includes an energy converter 422, a sensor 424, an information repository 426, and a recording and reporting engine 428.

Since burner systems that vibrate significantly often exhibit unstable tendencies, the burner system 420 includes both an energy converter 422 to generate and harvest energy from the vibrations of the burner system 420 and a sensor 424 to monitor and capture the vibrations. As a result, the same vibrations that indicate the status or longevity of the burner component also provide the power to perform periodic recordings of periodic transitions of the recoded vibrations.

Energy converter 422 captures energy from an external source and stores the captured energy for later use. Generally, energy harvesting provides a very small amount of power for low-energy electronics. Energy converter 422 captures mechanical vibrations and converts the vibrations to usable electrical energy to charge a battery, a capacitor, or directly power sensor 424, a processor (similar to processor 202 of FIG. 2), or a communications unit (similar to communications unit 206 of FIG. 2). In certain embodiments, energy converter 422 is an electromechanical generator for harvesting useful electrical power from ambient vibrations. For example, the energy converter 422 can be a magnetic inductor and can include a magnet-coil generator that includes a spring-mass combination attached to a magnet or coil such that when the system vibrates, a coil cuts through the flux formed by a magnetic core In another example, the energy converter 422 can include piezoelectric crystals or fibers that are used to generate a small voltage whenever the crystals or fibers are mechanically deformed, such as by vibration. Alternative embodiments are possible by those skilled in the art.

Sensor 424 can include one or more sensors that can meter a physical quantity and convert metered or detected information into an electrical signal. In certain embodiments, sensor 424 is an inertial sensor (such as, an accelerometer, a gyroscope, or a magnetometer) that is capable of detecting and capturing vibrations of the burner system 420. Sensor 424 is capable of detecting the frequency of the vibrations, the magnitude of the vibrations, and the like. In certain embodiments, sensor 424 is capable of detecting velocity, displacement and proximity, or acceleration of the burner system 420. For example, a displacement sensor or proximity sensors measure motions, internal clearance, and vibrations relative to other support structures. Generally, displacement or proximity sensors are used in low-frequency (1 to 100 Hz) measurement and measure low-amplitude displacement. In another example, velocity sensors are used for low to medium frequency measurements (1 to 1000 Hz) and are useful for vibration monitoring. Generally, velocity sensors have lower sensitivity to high frequency vibrations than accelerometers. In another example, an accelerometer measure low to very high frequencies. For instance, a piezoelectric accelerometer is often can detect large for frequency and amplitude ranges. The sensor 424 can further include a control circuit for controlling at least one of the sensors included therein.

Information repository 426 can be implemented using any architecture known in the art such as, for example, a relational database, an object-oriented database, or one or more tables, or a combination thereof. Information repository 426 stores data captured by the sensor 424. For example, the information repository 426 stores the frequency or amplitude or both of the vibrations associated with the burner system 420. In certain embodiments, additional sensors draw power from the energy converter 422 and the store their meted data in the information repository 426. For example, pressure sensors, temperature sensors, flow sensors and the like can store information in the information repository 426. In certain embodiments, the information repository 426 overwrites the recorded data at predetermined periods. For example, the recording and reporting engine 428 can instruct the information repository 426 to overwrite previous data after the successful transmission of the recorded data to the server 430 or the operator console 440 (or after a certain number of successful transmissions). In another example, the information repository 426 can maintain the data for a predetermined period of time. In certain embodiments, the information repository 426 is external to the burner system 420.

The recording and reporting engine 428 monitors and controls the recording and reporting of the vibrations sensed via sensor 424. In certain embodiments, the recording and reporting engine 428 instructs the sensor 424 to capture and record vibrations of the g burner component at predetermined intervals. The recordings can occur multiple times a day to several times a week, and anywhere in-between. In certain embodiments, the recording and reporting engine 428 can instruct various auxiliary sensors to also record sensed data into the information repository at predetermined time intervals. The various auxiliary sensors can include a temperature sensor, a pressure sensor, a flow sensor and the like. In certain embodiments, the recording and reporting engine 428 transmits the recorded data from the information repository 426 to the server 430, the operator console 440 or both via network 410 at predetermined time intervals. It is noted that each predetermined time intervals can be the same or different. For example, the recording and reporting engine 428 can instruct the sensor to record data at predetermined intervals and transmit the data after a certain number of recordings. By transmitting the data after a certain number of recordings reduces the number of transmissions and can transmit a larger payload in each transmission. In certain embodiments, the recording and reporting engine 428 monitors the power level of the energy converted or harvested by the energy converter 422.

The server 430 is a remote server that receives and analyzes the data transmitted from the burner system 420. The server 430 may include internal and external components as previously depicted and described in further detail with respect to FIG. 2. In certain embodiments, the server 430 represents a "cloud" of computers interconnected by one or more networks (such as network 410), where server 430 is a computing system utilizing clustered computers and components to act as a single pool of seamless resources when accessed. Server 430 includes analyzer 432 and notification generator 434.

The analyzer 432 analyzes the received vibrations from the burner component. The analyzer 432 detects changes in the vibration patterns such as if the frequency changes as well as changes in the amplitudes of the vibrations. In certain embodiments, the analyzer 432 derives a baseline vibration associated with the burner system 420. A baseline vibration is the general frequency, or amplitude or both of the vibrations associated with the burner system 420 or any of its components in certain embodiments, the analyzer 432 determines whether a deviation from the baseline occurs. The analyzer 432 can then identify the cause of the deviation. For example, the deviation can be caused by temperature, pressure, or flow rate changes of the gas. In another example, the deviation can be caused by a component of the burner system 420 starting to fail. In another example, the deviation can be caused by a component of burner system 420 having already failed. If it is determined that the deviation of the vibrations is due to normal expected changes to the system, then the analyzer 432 determines that the burner system 420 is functioning properly. If it is determined that the deviation of the vibrations is due to the burner component starting to fail, then the notification generator 434 generates and transmits a notification to an indicated end-user device or an operator console, such as operator console 440, instructing an individual plant operator to perform a remedying action. In certain embodiments, the remedying action can include replacing or repairing the faulty burner system 420.

The operator console 440 is similar to any operator console, such as operator console 110 of FIG. 1, or controller, such as controller 106 of FIG. 1, or any combination thereof. In certain embodiments, the server 430 and the operator console 440 are the same. For example, the component of the burner system 420 transmits the data to operator console 440, where the operator console 440 includes the analyzer 432 that analyzes the received vibrations. The operator console 440 provides a notification to an individual indicating the failure or potential failure of a component of the burner system 420.

Figure 5:
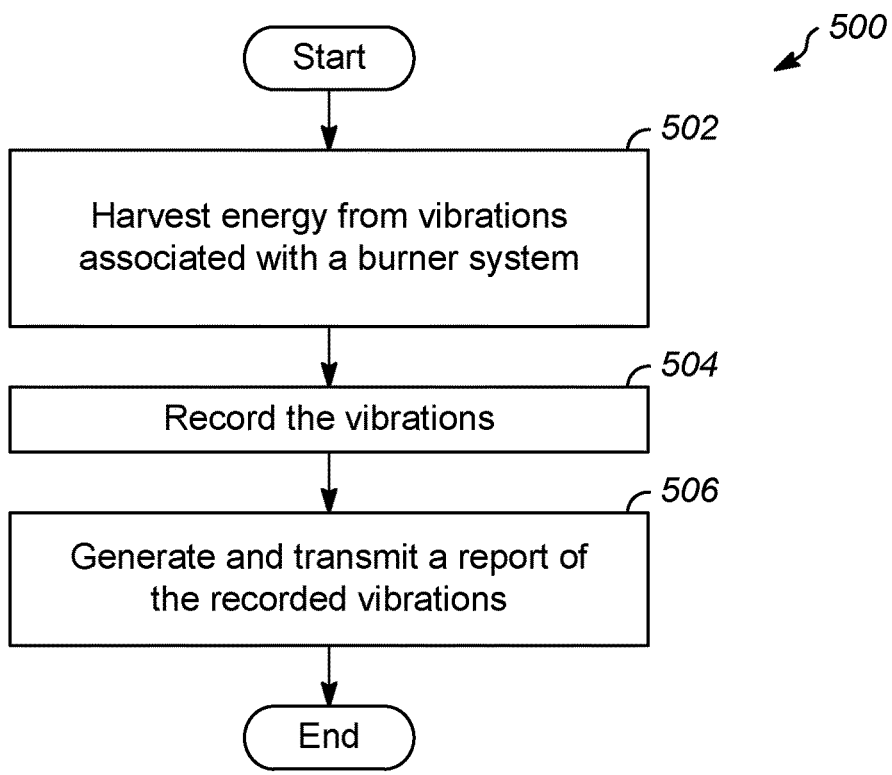
FIG. 5 is an example method for generating and transmitting a report of recorded vibrations associated with a burner component according to this disclosure.

FIG. 5 is an example method 500 for generating and transmitting a report of recorded vibrations associated with a burner system according to this disclosure. The steps in FIG. 5 can be performed by the burner system 420, in particular the recording and reporting engine 428, as shown in FIG. 4.

As shown in FIG. 5, the burner system 420 generates energy from vibrations associated with the burner system at step 502. This could include, for example, a device that captures mechanical vibrations and converts the vibrations to usable electrical energy to change a battery, a capacity or directly power one or more electrical devices.

At step 504, the burner system 420 detects vibrations by a vibration sensor and records the vibrations in an information repository. For example, the burner system 420 utilizes a vibration sensor to detect vibrations, which are the same vibrations that the burner component uses to generate energy. The recorded vibrations can include the frequency of the vibrations. The recorded vibrations can include the amplitude of the vibrations. In certain embodiments, the vibrations are recorded at a predetermined time interval In certain embodiments, the temperature, pressure, or flow rate of the gas is also recorded. In certain embodiments, the recording and reporting engine 428 can also analyze the recorded vibrations and transmit a notification at a non-predetermined time interval if it is identified that the vibrations indicate that at least a component of a burner system is failing.

At step 506, the burner system 420 generates and transmits a report of the vibrations to server 430 for analysis. In certain embodiments, the report is transmitted at a predetermined time interval. In certain embodiments, the predetermined time interval of recording the vibrations and the predetermined time interval of generating and transmitting the report are different. For example, an operator of the plant can request that the vibrations be recorded multiple times a day, and the report is generated and transmitted only once a day. In certain embodiments, if no vibrations are detected, then a report is generated and transmitted indicating that the burner component has failed. In certain embodiments, the generated report is transmitted when the energy converter 422 generates a predetermined quantity of energy. In certain embodiments, a report is generated and transmitted when no vibrations are detected.

Figure 6:
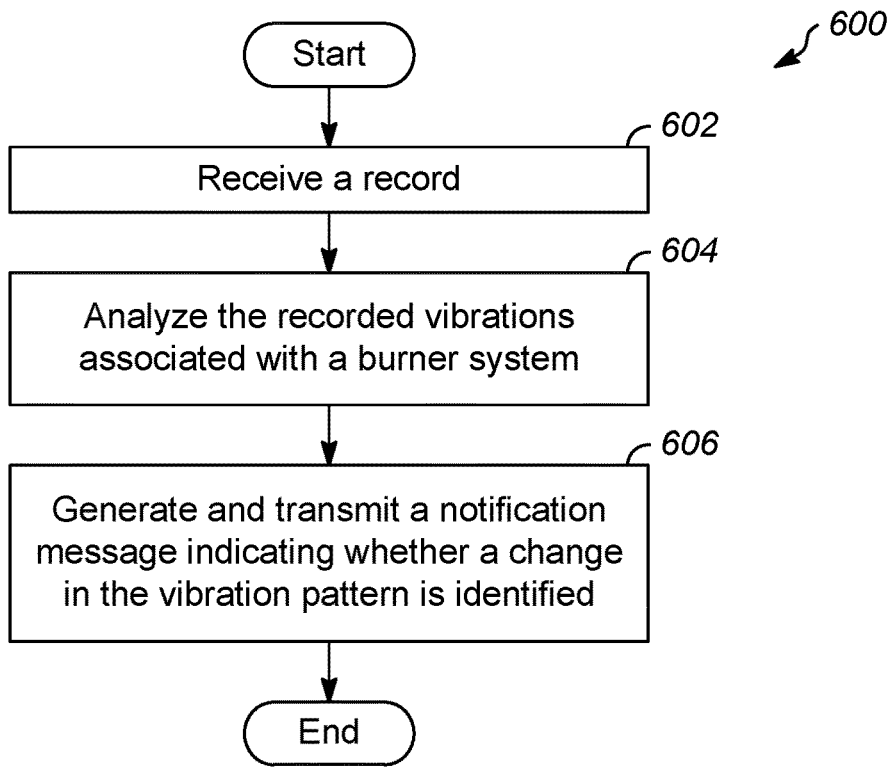
FIG. 6 is an example method for analyzing the vibrations associated with a burner according to this disclosure.

FIG. 6 is an example method 600 for analyzing the vibrations associated with a burner system according to this disclosure. The steps in FIG. 6 can be performed by server 430 or the operator console 440 as shown in FIG. 4. The steps in FIG. 6 can be performed by server 116 as shown in FIG. 1.

As shown in FIG. 6, server 430 receives a report that includes the vibrations of the burner system in step 602. This can include the vibration amplitude, the vibration frequency, as well as various metered parameters of the gas pressure system such as pressure, temperature and flow of the gas.

At step 604, the server 430 analyzes the received report to detect a change in the vibration patterns in order to determine the status of the burner component. For example, if a change in the vibrations is detected, the server determines whether the change is based on a physical change of the burner system (such as the device is failing) or the change is caused by changes in the gas flowing through the burner component. In certain embodiments, the serve can generate a baseline vibration of the burner component and any deviation from the baseline the server identifies whether the burner component is failing. For example, a change in vibrations can be caused by external factors to the burner component such as changes in the pressure upstream of the burner component In another example, change in vibrations can be caused by external factors to the burner component such as changes in the temperature upstream or downstream of the burner component.

At step 606 the server 430 generates and transmits a notification indicating the operational status of the burner system. In certain embodiments, the message is generated to indicate a change in the vibration patterns. In certain embodiments, the server generates a second message that indicates that the pressure regulating valve is failing. In certain embodiments, a message is transmitted only when the server determines that the server is failing in step 604. In certain embodiments, a message is generated indicating that the burner component is functioning correctly. In certain embodiments, the generated notification also includes the received temperature, pressure or flow of the gas, or a combination thereof.

Although FIG. 5 and FIG. 6 illustrate single examples of a method 500 and 600, respectively, for recording and analyzing vibrations associated with a burner system related to an industrial process control and automation system, various changes may be made to FIG. 5 and FIG. 6. For example, while each figure shows a series of steps, various steps in each figure could overlap, occur in parallel, occur in a different order, or occur any number of times. Also, each method could include any number of events, event information retrievals, and notifications.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An electronic device operably coupled to a burner system, the electronic device comprising:
   a vibration sensor configured to detect vibrations of at least one burner component;
   a memory configured to store the detected vibrations;
   a processor operably coupled to the vibration sensor and the memory, wherein the processor is configured to:
      record the detected vibrations caused by the burner component at a predetermined time interval, and
      generate a report of the recorded vibrations caused by the burner component to indicate an operational status of the burner component, wherein the generated report includes at least two recorded vibrations; and
   a communication interface configured to transmit the generated report when a predetermined quantity of energy is converted.

2. The electronic device of claim 1 wherein said burner component is selected from a combustion air blower, a burner body, air control valves, fuel control valves, an exhaust stack and a safety shut off valve.

3. The electronic device of claim 1, further comprising an energy converter configured to convert energy vibrations of the burner component to electrical energy to provide power to the vibration sensor, the memory, the processor and the communication interface.

4. The electronic device of claim 1, wherein
   the predetermined time interval is a first predetermined time interval;
   the communication interface is further configured to transmit the generated report at a second predetermined time interval; and
   the first predetermined time interval occurs more frequently than the second predetermined time interval.

5. The electronic device of claim 1, wherein:
   the processor is further configured to generate a second report when the vibration sensor detects no vibrations; and
   the communication interface is further configured to transmit the second report.

6. The electronic device of claim 1, further comprising a temperature sensor configured to detect temperature of gas within proximity to the burner component, and wherein the processor is operably coupled to the temperature sensor and further configured to:
   record the detected temperature of the gas, and
   generate the report of the recorded temperature of the gas.

7. An electronic device comprising:
   a communication interface configured to receive a report when a predetermined quantity of energy is converted, and transmit a notification message, wherein the received report includes recorded vibrations of a burner component; and
   a processor operably coupled to the communication interface, wherein the processor is configured to:
      identify a pattern in the vibrations within the received report based on at least one of frequency or magnitude of the vibrations;
      analyze the recorded vibrations to detect a change in the identified pattern and generate the notification message indicating an operational status of the burner component based on whether a change in the vibration pattern is identified.

8. The electronic device of claim 7, wherein the processor is further configured to derive a baseline vibration pattern of the burner component based on the recorded vibrations.

9. The electronic device of claim 8, wherein the processor is further configured to:
determine whether a deviation of the baseline vibration pattern occurs; and
identify whether the deviation occurred based on the burner component beginning to fail; and
generate a second notification message when the operational status of the burner component begins to fail.

10. The electronic device of claim 7, wherein the processor is further configured to determine whether the burner component is functioning correctly based on the identified change of the vibration pattern.

11. The electronic device of claim 7, wherein the processor is further configured to identify that the burner component is failing when the magnitude of vibrations increases.

12. The electronic device of claim 7 wherein said burner component is selected from a combustion air blower, a burner body, air control valves, fuel control valves, an exhaust stack and a safety shut off valve.

13. A method comprising:
detecting vibrations of a burner component:
recording the detected vibrations caused by the burner component at a predetermined time interval;
generating a report of the recorded vibrations caused by the burner component to indicate an operational status of the burner component, wherein the generated report includes at least two recorded vibrations; and
transmitting the generated report when a predetermined quantity of energy is converted.

14. The method of claim 13 wherein said burner component is selected from a combustion air blower, a burner body, air control valves, fuel control valves, an exhaust stack and a safety shut off valve.

15. The method of claim 14, further comprising converting energy vibrations of the burner component to electrical energy.

16. The method of claim 14, wherein:
the predetermined time interval is a first predetermined time interval;
the generated report is transmitted at a second predetermined time interval; and
the first predetermined time interval occurs more frequently than the second predetermined time interval.

17. The method of claim 14, further comprising:
generating a second report when no vibrations are detected; and
transmitting the second report.

18. The method of claim 14, further comprising:
recording a detected parameter of a burner system, wherein the parameter is at least one of a temperature, a pressure, or a flow; and
transmitting a generated report of the recorded parameter.

* * * * *